(12) United States Patent
Mehta et al.

(10) Patent No.: US 11,750,739 B2
(45) Date of Patent: Sep. 5, 2023

(54) VISUAL INDICATION OF COMMUNICATION SUSPENSION AT AN ENDPOINT SYSTEM

(71) Applicant: Avaya Inc., Basking Ridge, NJ (US)

(72) Inventors: Viralkumar R. Mehta, Adajan Char-rasta (IN); Shivani Gupta, Gangapur (IN)

(73) Assignee: Avaya Management L.P., Morristown, NJ (US)

( * ) Notice: Subject to any disclaimer, the term of this patent is extended or adjusted under 35 U.S.C. 154(b) by 417 days.

(21) Appl. No.: 16/251,502

(22) Filed: Jan. 18, 2019

(65) Prior Publication Data
US 2020/0236214 A1 Jul. 23, 2020

(51) Int. Cl.
*H04M 3/428* (2006.01)
*G08B 5/22* (2006.01)
*G08B 5/36* (2006.01)

(52) U.S. Cl.
CPC .......... *H04M 3/4286* (2013.01); *G08B 5/222* (2013.01); *G08B 5/36* (2013.01); *H04M 2201/42* (2013.01)

(58) Field of Classification Search
CPC ....... G08B 5/222; G08B 5/36; H04M 3/4286; H04M 2201/42; H04M 3/428; H04M 1/247; H04M 1/642; H04M 3/4285; H04M 3/5133; H04M 3/5183; H04M 7/0012; H04M 3/5191; H04M 1/80; H04M 3/42314; H04M 3/487; H04M 7/006; H04M 2201/40; H04M 2203/2011; H04M 2203/2088; H04M 2203/306; H04M 2203/352; H04M 2250/74; H04B 1/709; H04W 4/12; H04W 4/16; H04L 65/1069; H04L 65/1101; B60G 2202/42
USPC ......... 340/540; 348/14.04; 379/93.13, 88.22, 379/101.01, 188, 215.01, 266.06, 372, 379/142.01, 204.01, 88.12, 393, 88.26, 379/162, 201.01, 202.01, 207.02, 265.02; 455/569.1, 569.2, 414.1; 704/270; 709/203, 205, 229, 204; 715/783; 725/111; 370/328, 329, 522
See application file for complete search history.

(56) References Cited

U.S. PATENT DOCUMENTS

| | | | | |
|---|---|---|---|---|
| 5,751,722 | A * | 5/1998 | Maekawa | H04N 7/147 348/14.01 |
| 5,930,339 | A * | 7/1999 | Nepustil | H04M 1/6505 379/215.01 |
| 6,118,861 | A * | 9/2000 | Gutzmann | H04M 3/428 379/201.01 |
| 6,295,551 | B1 * | 9/2001 | Roberts | G06F 9/44526 709/203 |
| 6,725,272 | B1 * | 4/2004 | Susai | H04L 29/06 709/229 |
| 6,798,872 | B1 * | 9/2004 | Matsumoto | H04M 15/06 379/142.01 |

(Continued)

*Primary Examiner* — Gerald Gauthier

(57) ABSTRACT

The technology disclosed herein enables an endpoint system to present a visual indicator that user communications have been suspended. In a particular embodiment, a method includes exchanging audio user communications for the communication between the first endpoint system and a second endpoint system. At the first endpoint system, the method includes determining that the second endpoint system caused a suspension of the audio user communications and providing a first visual indicator of the suspension.

14 Claims, 9 Drawing Sheets

(56) References Cited

U.S. PATENT DOCUMENTS

| | | | | |
|---|---|---|---|---|
| 7,006,618 | B1* | 2/2006 | Shaffer | H04M 1/2535 379/202.01 |
| 7,185,054 | B1* | 2/2007 | Ludwig | G06F 3/0482 348/E7.081 |
| 7,426,266 | B1* | 9/2008 | Roberts | H04M 3/42357 379/201.01 |
| 8,116,439 | B1* | 2/2012 | Runcie | H04M 3/20 379/201.1 |
| 8,619,965 | B1* | 12/2013 | Figa | H04M 3/4286 379/215.01 |
| 9,668,112 | B2* | 5/2017 | Figa | H04W 4/12 |
| 10,021,245 | B1* | 7/2018 | Koster | H04M 3/5133 |
| 10,057,418 | B1* | 8/2018 | Amir | H04M 3/4286 |
| 10,129,396 | B1* | 11/2018 | Desai | H04M 3/5166 |
| 10,141,973 | B1* | 11/2018 | Ramalho | H04B 1/709 |
| 10,250,749 | B1* | 4/2019 | Boone | H04M 3/5183 |
| 2001/0012335 | A1* | 8/2001 | Kaufman | H04M 3/493 379/201.01 |
| 2002/0146106 | A1* | 10/2002 | Himmel | H04M 3/428 379/215.01 |
| 2002/0191778 | A1* | 12/2002 | Che | H04M 1/72513 379/393 |
| 2003/0174818 | A1* | 9/2003 | Hazenfield | H04M 3/428 379/88.22 |
| 2004/0136515 | A1* | 7/2004 | Litwin, Jr. | H04M 3/56 379/202.01 |
| 2004/0165715 | A1* | 8/2004 | Scott | H04M 3/5166 379/265.02 |
| 2004/0203660 | A1* | 10/2004 | Tibrewal | H04M 3/42195 455/414.1 |
| 2005/0078810 | A1* | 4/2005 | Cromwell | H04M 1/22 379/188 |
| 2005/0147227 | A1* | 7/2005 | Chervirala | H04M 3/4286 379/215.01 |
| 2005/0152531 | A1* | 7/2005 | Hamilton, II | H04M 3/4285 379/88.19 |
| 2005/0201531 | A1* | 9/2005 | Kanter | H04M 3/4285 379/88.16 |
| 2006/0020993 | A1* | 1/2006 | Hannum | H04N 7/1215 725/111 |
| 2006/0126807 | A1* | 6/2006 | Weil | H04M 1/80 379/101.01 |
| 2007/0026904 | A1* | 2/2007 | Matsuda | H04M 1/6091 455/569.2 |
| 2007/0047711 | A1* | 3/2007 | Florkey | H04M 3/4285 379/162 |
| 2007/0223666 | A1* | 9/2007 | Teague | H04M 3/4285 379/162 |
| 2009/0021574 | A1* | 1/2009 | Iwami | H04N 5/44 348/14.04 |
| 2009/0168978 | A1* | 7/2009 | Laws | H04L 65/1089 379/93.17 |
| 2009/0249083 | A1* | 10/2009 | Forlenza | H04L 9/14 713/193 |
| 2010/0303227 | A1* | 12/2010 | Gupta | H04M 1/247 379/266.06 |
| 2011/0111735 | A1* | 5/2011 | Pietrow | H04M 1/72513 455/414.1 |
| 2011/0170681 | A1* | 7/2011 | Kole | H04M 3/4286 379/162 |
| 2012/0139726 | A1* | 6/2012 | Brunson | H04M 3/4285 340/540 |
| 2013/0003951 | A1* | 1/2013 | Pitschel | H04M 3/4285 379/93.13 |
| 2014/0044249 | A1* | 2/2014 | Brittain | H04L 65/1069 379/204.01 |
| 2014/0149919 | A1* | 5/2014 | Larson | G06F 3/0482 715/783 |
| 2015/0071124 | A1* | 3/2015 | Efrati | H04M 3/4285 370/259 |
| 2015/0110260 | A1* | 4/2015 | Marum | G10L 13/00 379/207.02 |
| 2015/0139075 | A1* | 5/2015 | Bosch | H04L 65/1069 370/328 |
| 2015/0139085 | A1* | 5/2015 | Kaczmarska-Wojtania | H04L 5/0053 370/329 |
| 2015/0332708 | A1* | 11/2015 | Keller | G10L 25/48 704/270 |
| 2015/0358850 | A1* | 12/2015 | La Roche, Jr. | H04W 28/0215 370/328 |
| 2015/0381674 | A1* | 12/2015 | Klemm | H04M 3/5166 709/203 |
| 2016/0065707 | A1* | 3/2016 | Yang | H04M 1/6066 455/569.1 |
| 2016/0352903 | A1* | 12/2016 | Hp | H04M 3/48 |
| 2018/0219996 | A1* | 8/2018 | Amir | H04M 3/4286 |
| 2020/0137227 | A1* | 4/2020 | Deole | H04M 3/4286 |
| 2020/0236214 | A1* | 7/2020 | Mehta | G08B 5/36 |

\* cited by examiner ively coupled with the one or more computer readable storage media. Program instructions stored on the one or more computer readable storage media, when read and executed by the processing system, direct the processing system to exchange audio user communications for the communication between the first endpoint system and a second endpoint system. The program instructions further direct the processing system to determine that the second endpoint system caused a suspension of the audio user communications and provide a first visual indicator of the suspension.

VISUAL INDICATION OF COMMUNICATION SUSPENSION AT AN ENDPOINT SYSTEM

TECHNICAL BACKGROUND

When user communications are suspended at the opposite end of a call from a user, the user is still connected to the call but cannot participate in user communications due to the suspension. The most common manner in which user communications may be suspended is when the opposite end user places the user communications on hold, although, other manners of suspending user communications also exist. Regardless of the cause, a user who has had their user communications suspended will likely only know that the suspension has occurred if some sort of audible indicator (e.g., on-hold music) is presented to them. Even if that user was notified that they will be placed on hold, for example, the user may still have reason to think that the communication disconnected if not for the audible indication that the communication is still connected. Such a user would also have to remain in a position to hear their call device to recognize when the suspension ends and user communications can proceed.

SUMMARY

The technology disclosed herein enables an endpoint system to present a visual indicator that user communications have been suspended. In a particular embodiment, a method includes exchanging audio user communications for the communication between the first endpoint system and a second endpoint system. At the first endpoint system, the method includes determining that the second endpoint system caused a suspension of the audio user communications and providing a first visual indicator of the suspension.

In some embodiments, the method includes, at the first endpoint system, determining that the second endpoint system resumed the audio user communications and providing a second visual indicator that the audio user communications resumed. In those embodiments, providing the second visual indicator may include removing the first visual indicator.

In some embodiments, determining that the second endpoint system caused the suspension includes receiving a message indicating the suspension from the second endpoint system. In those embodiments, the message may include one of a Session Initiation Protocol (SIP), HyperText Transfer Protocol (HTTP), or H.323 message.

In some embodiments, determining that the second endpoint system caused the suspension includes receiving a message indicating the suspension from a communication control system facilitating the communication.

In some embodiments, determining that the second endpoint system caused the suspension includes processing the audio user communications to identify the suspension.

In some embodiments, the suspension includes one of the first endpoint system being placed on hold by the second endpoint system or the communication being in process of transfer to another endpoint system.

In some embodiments, the first visual indicator comprises an illuminated light on the first endpoint system.

In some embodiments, the first visual indicator comprises a graphical element presented on a display of the first endpoint system.

In another embodiment, an apparatus is provided having one or more computer readable storage media and a processing system operatively coupled with the one or more

DETAILED DESCRIPTION

The endpoint systems described herein provide, to a user, a visual indicator when user communications are suspended at another user system on a communication with the endpoint system. A common manner in which user communications are suspended is when a voice call is placed on hold. A user who is placed on hold does not know when the call will be taken off hold. At best, the user will be provided with an audible indicator that the call is on hold, such as the playing of on-hold music to the user (although no sound is intentionally played in some on-hold situations). The user therefore needs to listen for when communications resume and/or the audible indicator ceases in order to continue communicating. As such, the user must keep the call within earshot at all times to ensure they catch the call coming off hold. This requires the user to continue holding their phone up to their ear, put the call on speaker phone, continue wearing a headset for the call, or perform some other action to ensure the user can hear communications on the call. These actions are inconvenient for the user and may even affect other people in the user's vicinity (e.g., those that can hear the call on speaker phone). Providing a visual indicator, instead of or in addition to a mere audible indicator, reduces the inconvenience to the user and people around the user.

Figure 1:
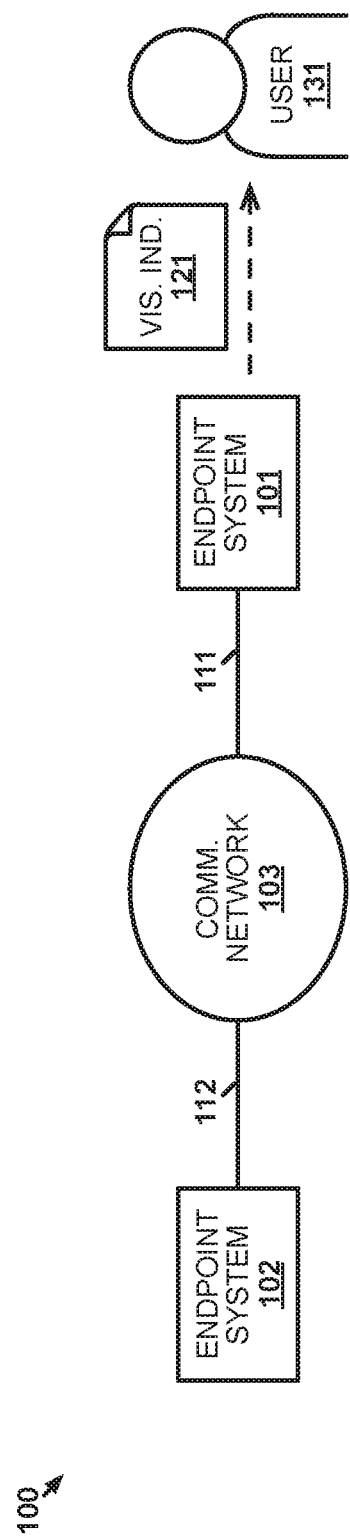
FIG. 1 illustrates an implementation for an endpoint system to provide a visual indicator that user communications have been suspended.

FIG. 1 illustrates implementation 100 for an endpoint system to provide a visual indicator that user communications have been suspended. Implementation 100 includes endpoint system 101, endpoint system 102, and communication network 103. Endpoint system 101 and communication network 103 communicate over communication link 111. Endpoint system 102 and communication network 103 communicate over communication link 112. Communication network 103 may comprise a single network of a single type (e.g., circuit switched or packet switched) or may comprise multiple networks include networks of different types.

In operation, endpoint system 101 is a user communication system operated by user 131. Endpoint system 101 may be a telephone, mobile phone, smartphone, personal computer, tablet computer, or some other type of computing system capable of exchanging user communications. Endpoint system 102 is the endpoint system with which endpoint system 101 communicates in this example to exchange user communications. Endpoint system 102 may also be a user communication system operated by a user but may instead be an automated communication system, such as an interactive voice response (IVR) system, that exchanges user communications with user 131. Should endpoint system 102 suspend the exchange of user communications with endpoint system 101, endpoint system 101 provides visual indicator 121 to user 131 during that suspension, which keeps user 131 apprised of the suspension, as described below.

Figure 2:
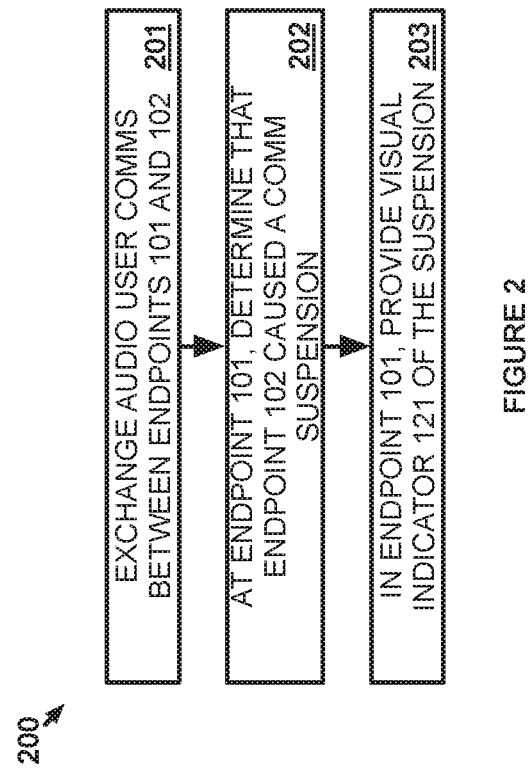
FIG. 2 illustrates an operational scenario for an endpoint system to provide a visual indicator that user communications have been suspended.

FIG. 2 illustrates operational scenario 200 for an endpoint system to provide a visual indicator that user communications have been suspended. In operational scenario 200, endpoint system 101 and endpoint system 102 are connected on a communication and exchange audio user communications for that communication (201). The audio user communications may be the only user communications exchanged or may accompany video, images, graphics, documents, or some other type of user consumable communications that can be transferred over communication network 103—including combinations thereof. The communication may comprise a traditional telephone call over which voice communications are exchanged for user 131 and a user of endpoint system 102. Alternatively, the communication may comprise a newer type of communication, such as a communication established over a packet communication network using Session Initiation Protocol (SIP), HyperText Transfer Protocol, H.323, or some other packet based communication protocol.

During the communications endpoint system 101 determines that endpoint system 102 caused a suspension of the audio user communications (202). The suspension of the audio user communications includes any situation where endpoint system 102 can prevent audio user communications therefrom from reaching endpoint system 101 for presentation. Endpoint system 102 may simply stop sending audio user communications, may direct an intermediate system to intercept the audio user communications to prevent the audio user communications from reaching endpoint system 101 (e.g., may direct a communication control system that audio user communications with endpoint system 101 should be placed on hold), or may perform some other action that prevents audio user communications from being presented at endpoint system 101. In place of the audio user communications, endpoint system 101 may have received silence or some other type of audio media (e.g., on-hold music) for presentation by endpoint system 101 during the suspension. Common situations that suspend audio user communications include endpoint system 102 placing endpoint system 101 on hold or initiating a call transfer from endpoint system 102 to another endpoint system.

The suspension may similarly prevent audio user communications from endpoint system 101 to be received and presented at endpoint system 102, although, some situations may allow for a monitor-type condition where endpoint system 102 continues to receive and/or present audio user communications from endpoint system 101. Additionally, the suspension of audio user communications may also include a suspension of other types of user communications, such as video, that may be exchanged on the communication between endpoint system 101 and endpoint system 102. Endpoint system 101 may determine the suspension by receiving a message notifying of the suspension from endpoint system 102 or some other communication system, by analyzing the audio communications received on the communication to identify the suspension (e.g., recognizing on-hold music or silence), or in some other manner.

Once endpoint system 101 has determined the suspension, endpoint system 101 provides visual indicator 121 of the suspension to user 131 (203). The visual indicator may be a dedicated notification light illuminating on endpoint system 101, a notification light on endpoint system 101 illuminating in a particular color and/or pattern (e.g., a flashing pattern), a graphic being displayed on a display screen of endpoint system 101, or some other manner in which endpoint system 101 can visually indicate binary information to a user (e.g., whether the user communications are suspended). Preferably visual indicator 121 remains for the duration of the suspension so that user 131 can merely look at endpoint system 101 to recognize, via visual indicator 121, that the audio user communications remain suspended. User 131 need not continue to listen for when the audio user communications resume in any manner that would be inconvenient to the user (e.g., holding a handset of endpoint system 101 to their ear) or to other people nearby (e.g., putting the communication on speaker phone).

When endpoint system 102 causes the audio user communications to resume, endpoint system 101 may determine that the audio users communications have been resumed and provide another visual indicator that the user communications have been resumed. Endpoint system 102 may cause the resumption of the audio user communications by beginning to transfer the audio user communications again, by instructing an intermediate system to stop intercepting the audio user communications directed to endpoint system 101 (e.g., may direct a communication control system that audio user communications with endpoint system 101 should be taken off hold), or perform some other action necessary to reverse the effect of suspending the audio user communications above. Endpoint system 101 may determine that audio user communications have resumed by receiving a control message notifying of the resumption from endpoint system 102 or some other communication system, by analyzing the audio communications received on the communication to identify the resumption (e.g., recognizing on-hold music ending or audio user communications commencing), or in some other manner.

The visual indicator that the audio user communications have resumed may comprise removing visual indicator 121 from being presented by endpoint system 101 (e.g., turning off a notification light on endpoint system 101 representing visual indicator 121 or removing a graphic representing visual indicator 121 on a display screen of endpoint system 101). The visual indicator that the audio user communications have resumed may also be a new indicator, which may better grab user 131's attention. The new indicator may be a dedicated notification light illuminating on endpoint system 101 indicating that the audio user communications are not suspended, a notification light on endpoint system 101 illuminating in a particular color and/or pattern (e.g., a flashing pattern different than what may have been used for visual indicator 121), a graphic being displayed on a display screen of endpoint system 101, or some other manner in which endpoint system 101 can visually indicate binary information to a user (e.g., whether the user communications are suspended or resumed).

Figure 3:
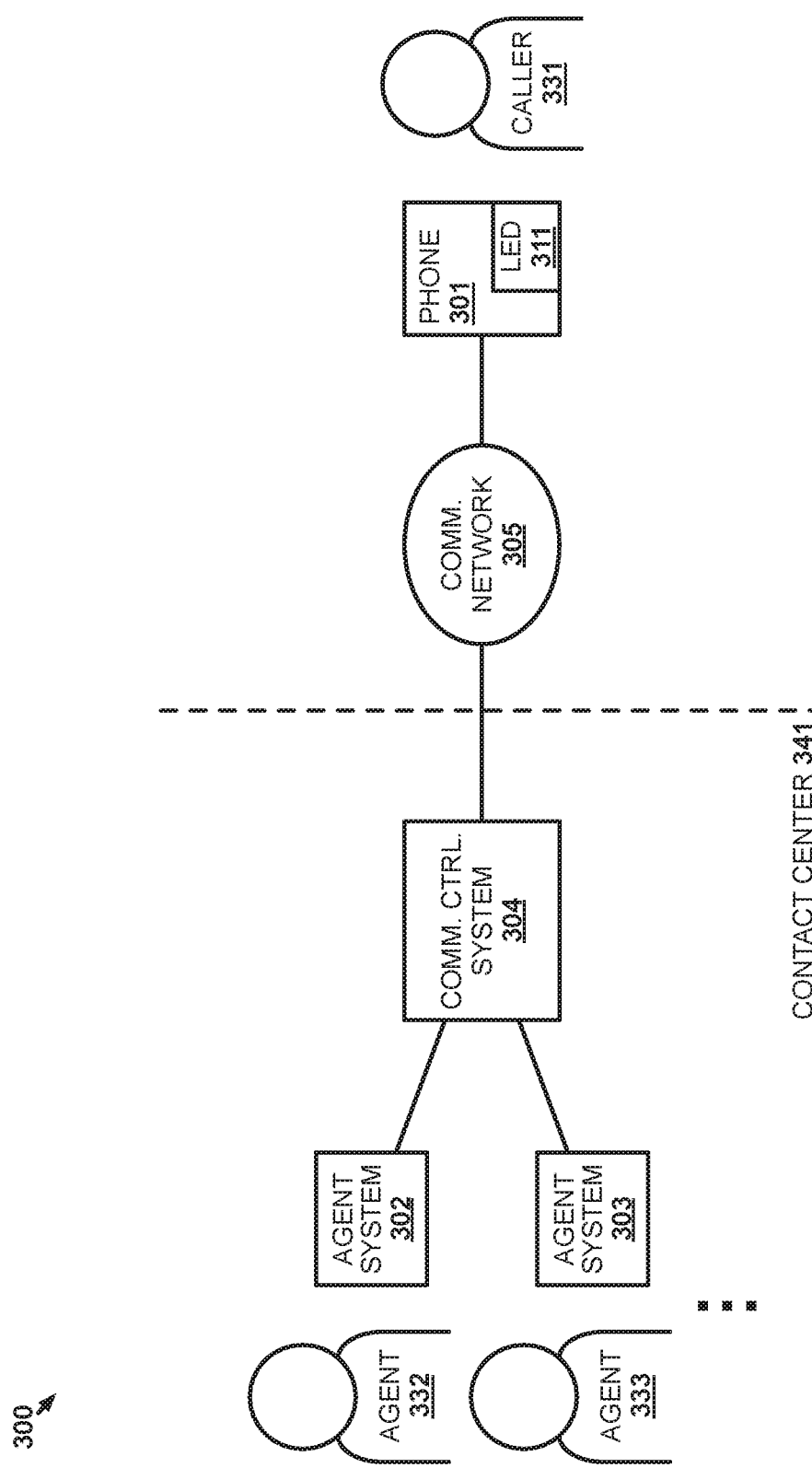
FIG. 3 illustrates another implementation for an endpoint system to provide a visual indicator that user communications have been suspended.

FIG. 3 illustrates implementation 300 for an endpoint system to provide a visual indicator that user communications have been suspended. Implementation 300 includes phone 301, agent user system 302, agent user system 303, communication control system 304, and communication network 305. Agent user system 302 and agent user system 303 are two of what may be any number of agent user systems of contact center 341. Phone 301 includes LED 311 for providing visual indicators to users. Communication network 305 may comprise a single network of a single type (e.g., circuit switched or packet switched) or may comprise multiple networks include networks of different types. While agent user system 302 and agent user system 303 are shown with direct connections to communication control system 304, agent user system 302 and agent user system 303 may communicate with communication control system 304 over a portion of communication network 305 internal to contact center 341. Likewise, it should be understood that agent user system 302 and agent user system 303 may be co-located with each other and/or communication control system 304 or may be distributed across multiple locations.

In operation, agent user system 302 and agent user system 303 are operated by agent 332 and agent 333, respectively. Agent 332 and agent 333 operate agent user system 302 and agent user system 303 to handle voice calls with contact center 341. Agent user system 302 and agent user system 303 may be desktop phones, computer workstations, or some other type of device capable of exchanging voice communications on behalf of their respective agents including combinations thereof. Phone 301 may be mobile phone, office/home phone device, or some other device that caller 331 may use to place a voice call to, and exchange voice communications with, an agent at contact center 341. Phone 301 includes LED 311 for indicating to caller 331 when a call to which phone 301 is connected has been placed on hold. Phone 301 may further include a display screen, as is common in many of the examples above, that can be directed to display an indicator that a call has been placed on hold. Endpoint system 800, described below, is an example endpoint system where a display screen is used to display the indicator. Other manners of displaying a visual indicator, such as Virtual Reality or Augmented Reality display systems, may also be used.

Figure 4:
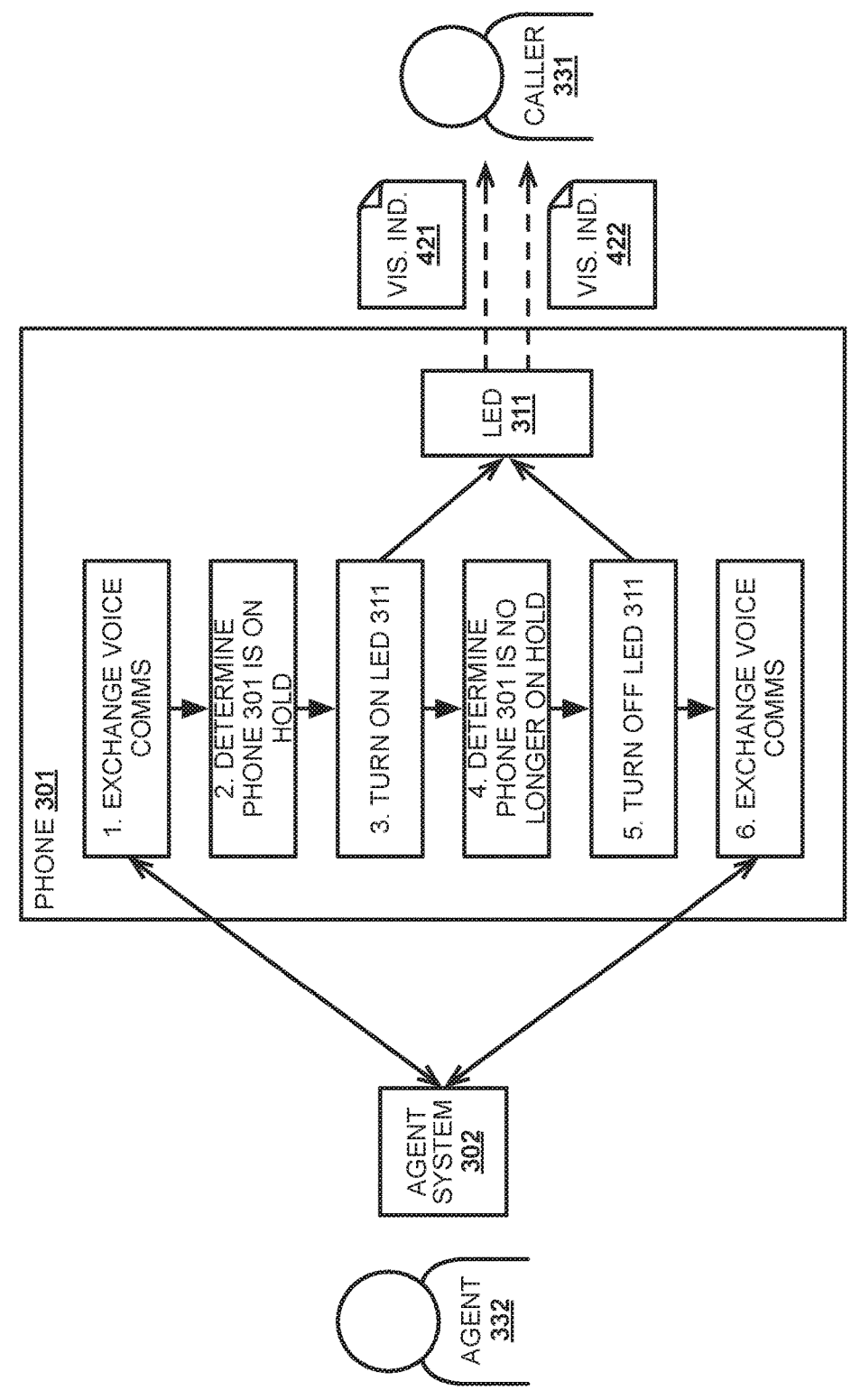
FIG. 4 illustrates another operational scenario for an endpoint system to provide a visual indicator that user communications have been suspended.

FIG. 4 illustrates operational scenario 400 for an endpoint system to provide a visual indicator that user communications have been suspended. In operational scenario 400, phone 301 and agent user system 302 exchange voice communication for a call at step 1 on behalf of their respective users, caller 331 and agent 332. At some point during the call, agent 332 directs agent user system 302 to place phone 301 on hold. For example, agent user system 302 may include a button or other user interface element that agent 332 activates to place the call on hold. The on-hold condition may be implemented solely within agent user system 302 or communication control system 304 may be notified of the on-hold instruction from agent user system 302 and perform the necessary actions to place phone 301 on hold.

After agent user system 302 places the call on hold, phone 301 determines at step 2 that agent user system 302 has placed phone 301 on hold. As described above in operational scenario 200, phone 301 may determine that phone 301 has been placed on hold by receiving a message from agent user system 302 (or communication control system 304) indicating that phone 301 has been placed on hold or may determine itself that phone 301 has been placed on hold based on the media be transferred over the call (e.g., based on detecting on-hold music). Once phone 301 determines that phone 301 has been placed on hold, phone 301 turns on LED 311 at step 3. Turning on LED 311 provides caller 331 with visual indicator 421 that phone 301, and consequently also caller 331, has been placed on hold. In this example, LED 311 remains on for the duration of the call being placed on hold. It should be understood that, while this example is directed towards using LED 311 as the visual indicator could take other forms, such as the displayed indicator in operational scenario 800 described below.

At a time after placing phone 301 on hold, agent 332 directs agent user system 302 to take phone 301 off hold. For example, agent user system 302 may include a button or other user interface element that agent 332 activates to take the call off hold (e.g., agent 332 may activate the same button that placed the call on hold or a dedicated button may be provided). If the on-hold condition is not implemented solely within agent user system 302, then communication control system 304 may be notified of the off-hold instruction from agent user system 302 and perform the necessary actions to take phone 301 off hold. Upon being taken off hold, phone 301 determines at step 4 that agent user system 302 has taken phone 301 off hold. As described above in operational scenario 200, phone 301 may determine that phone 301 is no longer on hold by receiving a message from agent user system 302 (or communication control system 304) indicating that phone 301 has been taken off hold or may determine itself that phone 301 has been taken off hold based on the media be transferred over the call (e.g., based on removal of on-hold music). In response to determining that phone 301 is no longer on hold, phone 301 turns off LED 311 at step 5. Turning off LED 311 provides caller 331 with visual indicator 422 that phone, and thereby caller 331, have been taken off hold. Caller 331 merely need notice visual indicator 422 before caller 331 can then continue exchanging voice communications with agent 332 via phone 301 and agent user system 302, respectively, on the call at step 6. Caller 331 does not need to constantly be listening for agent 332's voice to return to the call or for on-hold music to stop.

Figure 5:
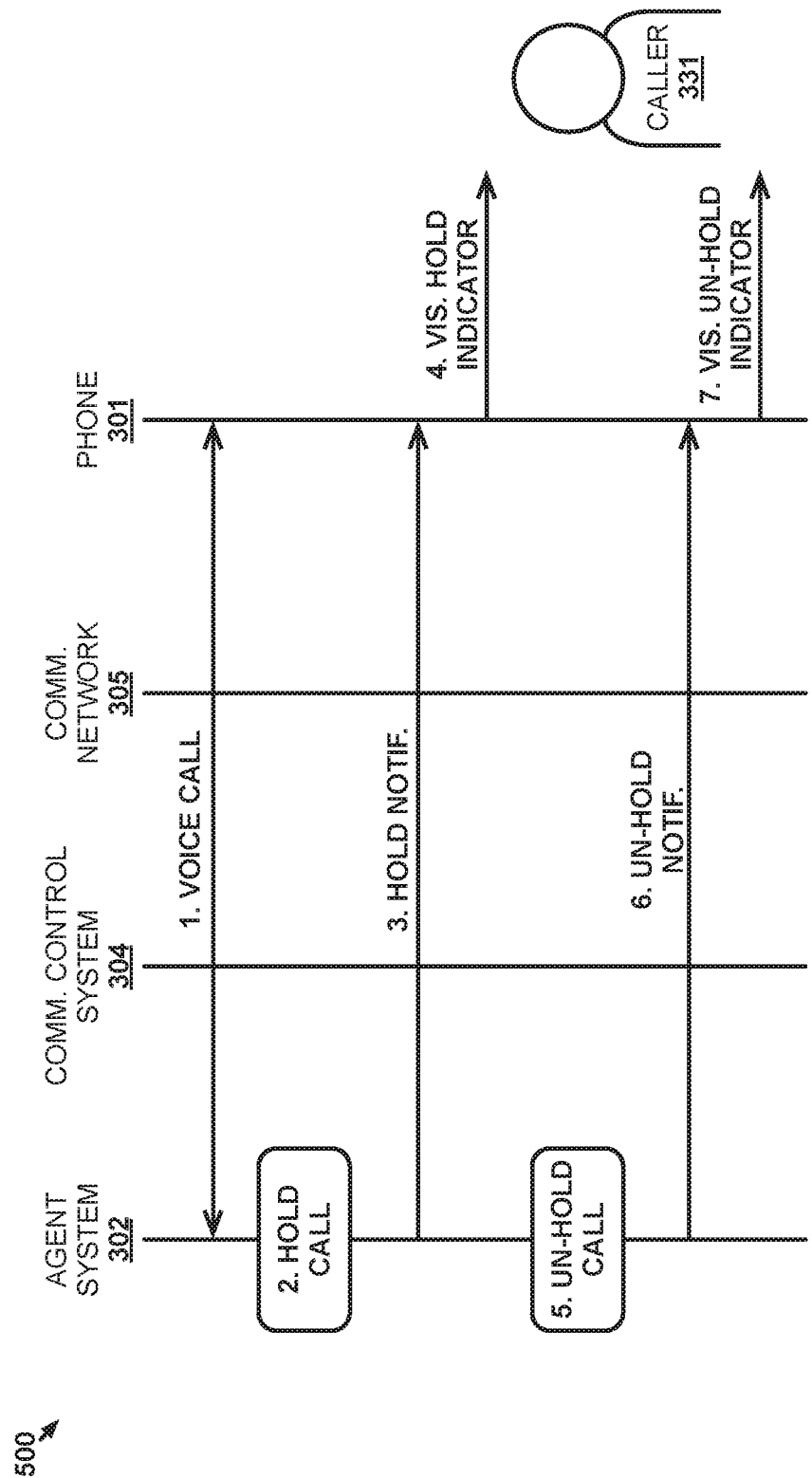
FIG. 5 illustrates yet another operational scenario for an endpoint system to provide a visual indicator that user communications have been suspended.

FIG. 5 illustrates operational scenario 500 for an endpoint system to provide a visual indicator that user communications have been suspended. Operational scenario 500 is an example of how agent user system 302 may notify phone 301 of phone 301 being placed on hold. Specifically, agent user system 302 and phone 301 are exchanging user communications at step 1 for a voice call between agent 332 and caller 331. While the user communications are shown passing through communication control system 304, the user communications may not pass through communication control system 304 in some examples, which may depend on the communication protocol used by contact center 341. During the voice call, agent user system 302 holds the call, likely at the direction of agent 332, at step 2 and transfers a hold notification control message to phone 301 at step 3 indicating that the voice call has been held. Some communication protocols, such as SIP, define a control message that will indicate to other endpoints when a call has been placed on hold. The hold notification message may also be defined by a proprietary protocol used by a client application executing on agent user system 302 and phone 301 to direct agent user system 302 and phone 301 to participate in the voice call. Regardless of the protocol used, the hold notification control message merely need be in a format that phone 301 understands indicates that agent user system 302 has placed the call on hold. Upon receiving the hold notification message, phone 301 presents a visual indicator at step 4 visually informing caller 331 that agent user system 302 has placed the call on hold.

When agent user system 302 takes the call off hold, likely at the direction of agent 332, at step 5, agent user system 302 transfers a un-hold notification control message at step 6 indicating that the call has been taken off hold. Like the hold notification control message above, the un-hold notification control message is transferred in any protocol that defines an un-hold notification control message in a format that phone 301 can understand. Once phone 301 receives the un-hold notification control message, phone 301 provides a visual indicator at step 7 that visually informs caller 331 that agent user system 302 has taken the call off hold. The voice communications between agent user system 302 and phone 301 can then continue.

Figure 6:
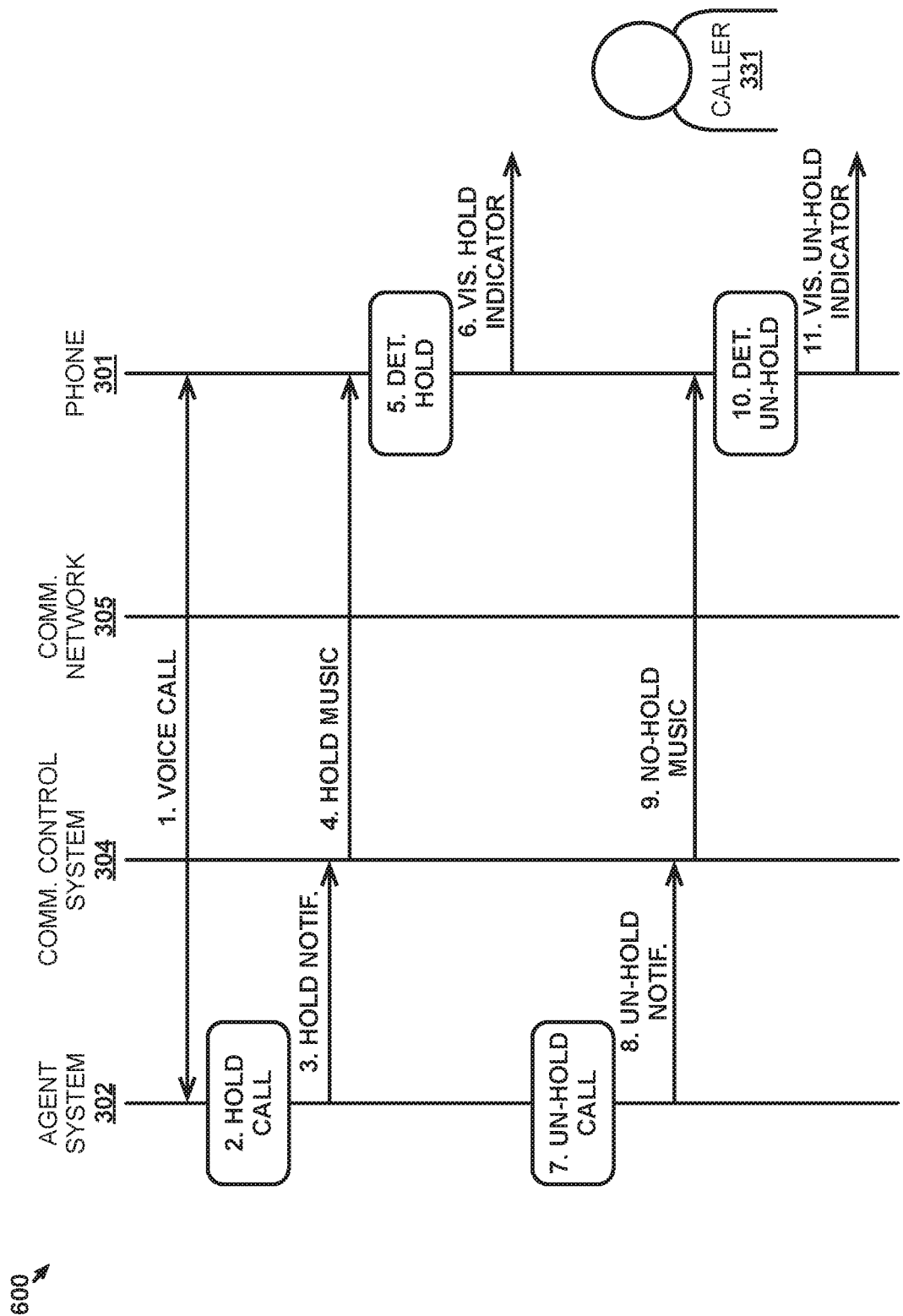
FIG. 6 illustrates a further operational scenario for an endpoint system to provide a visual indicator that user communications have been suspended.

FIG. 6 illustrates operational scenario 600 for an endpoint system to provide a visual indicator that user communications have been suspended. Operational scenario 600 is an example of how phone 301 may itself determine that agent user system 302 has placed phone 301 on hold. Agent user system 302 and phone 301 are exchanging user communications at step 1 for a voice call between agent 332 and caller 331. While the user communications are shown passing through communication control system 304, the user communications may not pass through communication control system 304 in some examples, which may depend on the communication protocol used by contact center 341. During the voice call, agent user system 302 holds the call, likely at the direction of agent 332, at step 2 and transfers a hold notification control message to communication control system 304 at step 3 indicating that the voice call has been held. Similar to the hold notification control message in operational scenario 500, the hold notification control message is transferred in any protocol that defines a hold notification control message in a format that communication control system 304 can understand.

In response to receiving the hold notification control message, communication control system 304 begins transferring hold music at step 4 to phone 301 in place of user communications from agent user system 302. Phone 301 processes the incoming audio using an audio recognition algorithm, which is configured to recognize music in place of typical voice communications, to determine at step 5 that the call has been placed on hold. Upon determining that the call has been placed on hold, phone 301 presents a visual indicator at step 6 visually informing caller 331 that agent user system 302 has placed the call on hold. In other examples, phone 301 may use algorithm(s) that identify type(s) of audio other than hold music that indicate the call is on hold. For example, phone 301 may recognize no audio, including background noise around agent 332, is being received on the call even though the call is still connected. Similarly to that example, phone 301 may simply identify that agent user system 302 is only transferring silence packets to recognize that the call is on hold.

When agent user system 302 takes the call off hold, likely at the direction of agent 332, at step 7, agent user system 302 transfers a un-hold notification control message to communication control system 304 at step 8 indicating that the call has been taken off hold. Like the hold notification control message above, the un-hold notification control message is transferred in any protocol that defines an un-hold notification control message in a format that communication control system 304 can understand. Responsive to that un-hold notification control message, communication control system 304 ceases transferring hold music at step 9 to phone 301. The hold music is then replaced with the resumption of user communications from agent user system 302. Phone 301 processes the incoming audio using an audio recognition algorithm, which is configured to recognize music in place of typical voice communications, to determine at step 10 that the hold music is no longer present and the call is, therefore, no longer on hold. In some examples, phone 301 may further recognize that the user communications from agent user system 302 have resumed (e.g., recognizes voice communications and/or background noise), which would help ensure the hold music is not simply between songs. Upon determining that the call has been taken off hold, phone 301 presents a visual indicator at step 11 visually informing caller 331 that agent user system 302 has taken the call off hold.

In some examples, another intermediate communication system in communication network 305 may be configured to perform the hold/un-hold recognition steps 5 and 10 in operational scenario 600. In those examples, upon the intermediate communication system recognizing the holding/un-holding of the call, the intermediate communication system may transfer notification control messages similar to those transferred in steps 3 and 6 of operational scenario 500. The intermediate communication system, therefore, offloads the audio processing functionality of steps 5 and 10 of operational scenario 600 and allows phone 301 to operate like phone 301 does in operational scenario 500. The control messages simply come from the intermediate communication system rather that agent user system 302.

Figure 7:
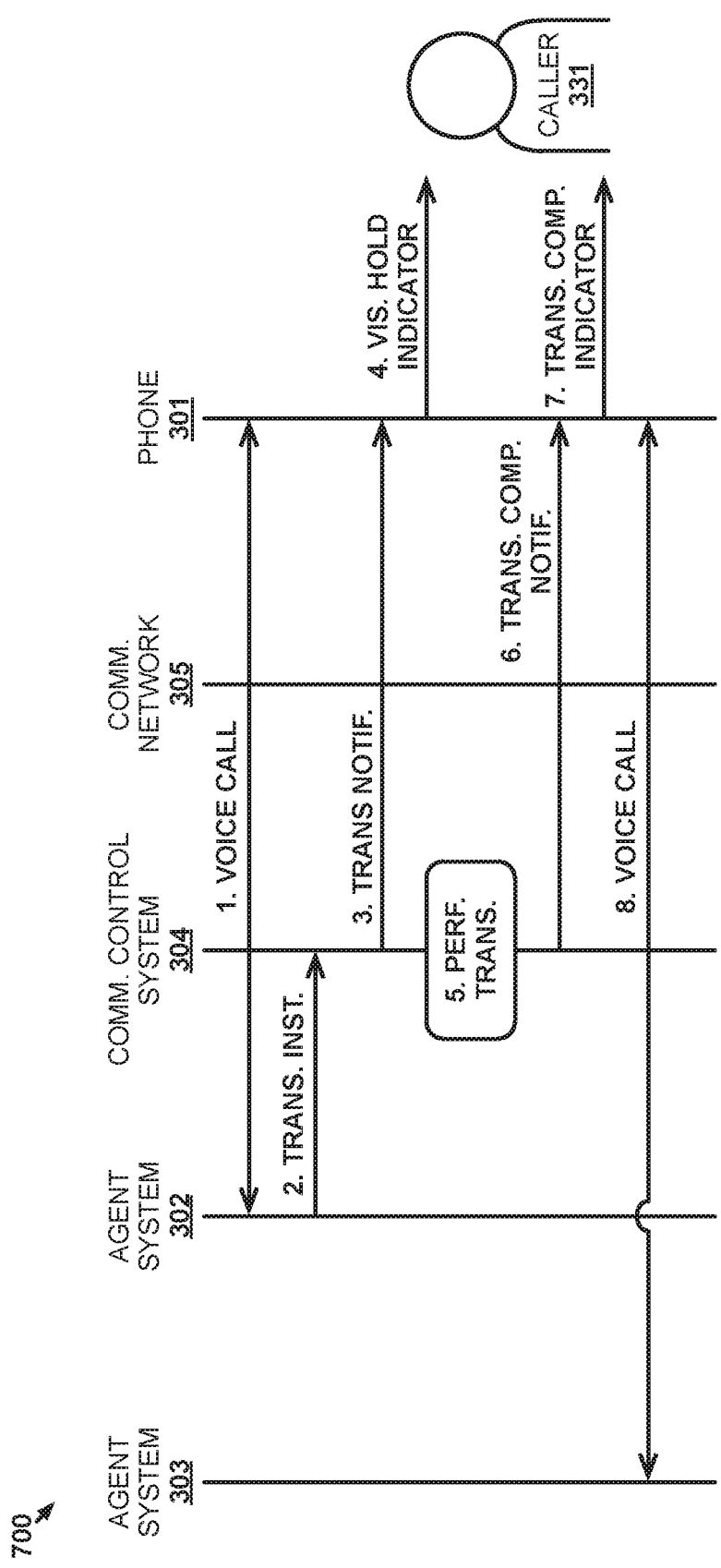
FIG. 7 illustrates one more operational scenario for an endpoint system to provide a visual indicator that user communications have been suspended.

FIG. 7 illustrates operational scenario 700 for an endpoint system to provide a visual indicator that user communications have been suspended. Operational scenario 700 is an example wherein voice communications are suspended for a reason other than the call being placed on hold. Agent user system 302 and phone 301 are exchanging user communications at step 1 for a voice call between agent 332 and caller 331. While the user communications are shown passing through communication control system 304, the user communications may not pass through communication control system 304 in some examples, which may depend on the communication protocol used by contact center 341. During the voice call, agent user system 302 transfers an instruction at step 2 to communication control system 304 directing communication control system 304 to transfer the call from agent user system 302 to agent user system 303. While performing any necessary background functions to transfer the call, user communications exchanged with phone 301 may be similar to the on-hold situations above because caller 331 cannot speak with anyone on the other end of the call. As such, communication control system 304 transfers a notification control message to phone 301 at step 3 indicating that the voice call is being transferred. In examples where phone 301 does not distinguish between the call being on hold or the call being transferred (e.g., presents the same visual indicator in either situation), the notification control message may be the same control message to indicate that the call has been placed on hold, as discussed above. However, at least in examples where phone 301 does distinguish (e.g., presents a different indicator for transfers versus holds), the notification control message will specifically indicate that the call is being transferred in a protocol that phone 301 understands. In response to receiving the notification control message, phone 301 presents a visual indicator at step 4 visually informing caller 331 that agent user system 302 has initiated a transfer to another agent user system.

At step 5, communication control system 304 performs the functions needed to transfer the call to agent user system 303 from agent user system 302. Once the call has been transferred, this example provides that a notification that the transfer is complete is transferred by communication control system 304 to phone 301 at step 6. Like the transfer notification control message above, the notification control message indicating the transfer is complete is transferred in any protocol that defines the notification control message in a format that phone 301 can understand. In some examples, the fact that phone 301 starts receiving user communications from agent user system 303 may serve as the notification that the transfer completed. In yet other examples, agent user system 303 and phone 301 may perform a handshake procedure that will serve as the notification to phone 301 that the transfer is complete. Upon receiving notification that the transfer is complete, phone 301 presents a visual indicator at step 7 visually informing caller 331 that the transfer is complete and the call is ready to proceed with agent user system 303. Caller 331 can then communicate with agent 333 on the voice call, which is now between phone 301 and agent user system 303.

Figure 8:
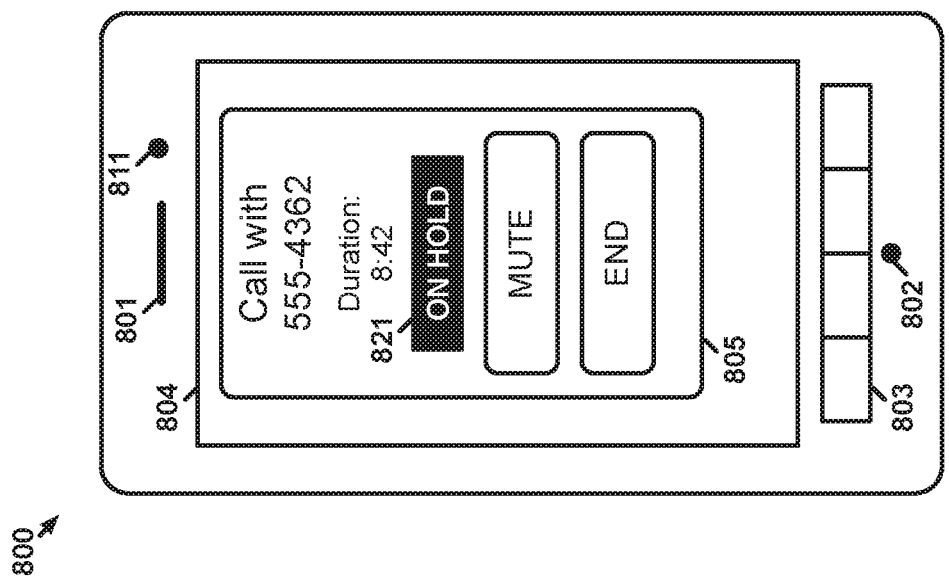
FIG. 8 illustrates an endpoint system to provide a visual indicator that user communications have been suspended.

FIG. 8 illustrates endpoint system 800 to provide a visual indicator that user communications have been suspended. Endpoint system 800 includes speaker 801, microphone 802, buttons 803, display screen 804, and LED 811. Endpoint system 800 is an example of phone 301, although phone 301 may take different forms. For instance, other examples having similar form factor to endpoint system 800 may include a different number of buttons 803, including the removal of buttons 803 altogether or may remove LED 811 and rely on display screen 804 for visual notifications.

In this example, endpoint system 800 executes an application for communicating with other endpoints. That application is presented by display screen 804 in call application window 805. Call application window 805 is displaying that endpoint system 800 is currently on a call with another endpoint, such as agent user system 302 above. When endpoint system 800 determines that the other endpoint has placed the call on hold, call application window 805 presents visual on-hold indicator 821 to visually notify the user of endpoint system 800 that they have been placed on hold. Visual on-hold indicator 821 may be a solid color, may be a pattern of different colors, may blink or otherwise show movement to be most noticeable to a user, or may take some other form that may improve noticeability of visual on-hold indicator 821 to a user. In some examples, visual on-hold indicator 821 may be much larger relative to the size of call application window 805 than shown. In some examples, LED 811 may also be lit in some manner (e.g., color, blinking pattern, etc.) to either accompany visual on-hold indicator 821 or substitute for visual on-hold indicator 821 (e.g., for when display screen 804 is off or call application window 805 is in the background).

When endpoint system 800 determines that the call has been taken off hold, visual on-hold indicator 821 may simply be removed from being shown in call application window 805 or an explicit indicator that the call has been taken off hold may be displayed instead. In one example, to ensure the user sees that the call has been taken off hold, call application window 805 may flash a bright color to better catch the user's attention, although less conspicuous indicators may instead be used. LED 811 may also be used to indicate that the call is no longer on hold by no longer being illuminated or by showing a different color and/or blinking pattern than was used for when the call was on hold.

Advantageously, the display of visual on-hold indicators by the call application via call application window 805 and/or LED 811 allows the user of endpoint system 800 to more easily recognize when a call is on hold and when that call is taken off hold. Moreover, given that endpoint system 800 when operating in accordance with the scenarios above determines when the call is actually on hold, the user of endpoint system 800 does not need to rely on their own hearing to recognize whether a call is on hold or something else had occurred (e.g., a user of an opposing endpoint is merely being quiet or an error has occurred on the call).

Figure 9:
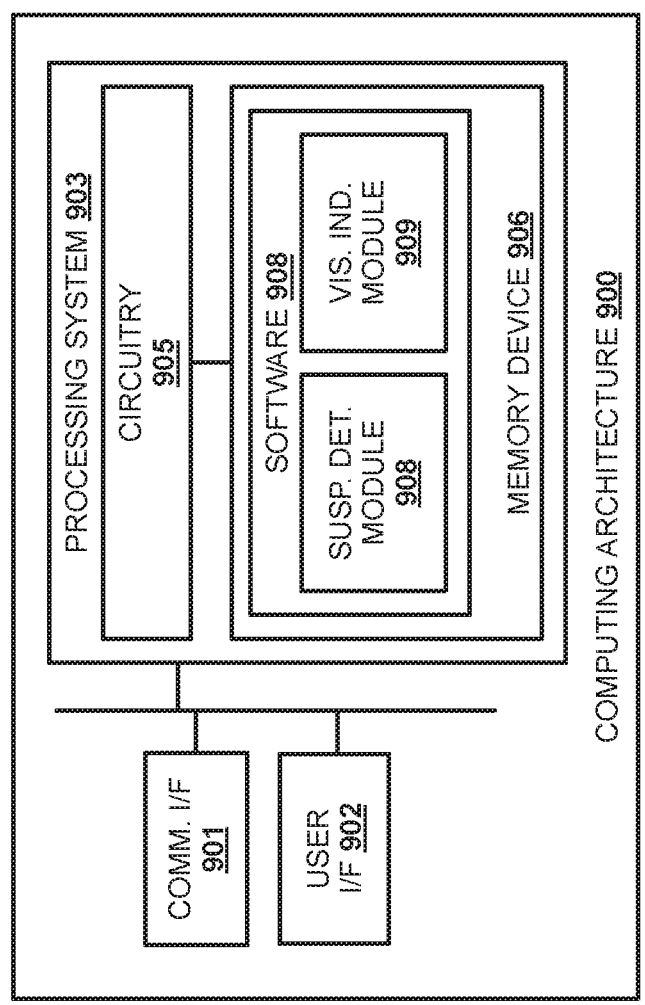
FIG. 9 illustrates a computing architecture for an endpoint system to provide a visual indicator that user communications have been suspended.

FIG. 9 illustrates computing architecture 900 for an endpoint system to provide a visual indicator that user communications have been suspended. Computing architecture 900 is an example computing architecture for endpoint system 101 and endpoint system 301, although systems 101 and 301 may use alternative configurations. A similar architecture may also be used for other systems described herein, although alternative configurations may also be used. Computing architecture 900 comprises communication interface 901, user interface 902, and processing system 903. Processing system 903 is linked to communication interface 901 and user interface 902. Processing system 903 includes processing circuitry 905 and memory device 906 that stores operating software 907.

Communication interface 901 comprises components that communicate over communication links, such as network cards, ports, RF transceivers, processing circuitry and software, or some other communication devices. Communication interface 901 may be configured to communicate over metallic, wireless, or optical links. Communication interface 901 may be configured to use TDM, IP, Ethernet, optical networking, wireless protocols, communication signaling, or some other communication format—including combinations thereof.

User interface 902 comprises components that interact with a user. User interface 902 may include a keyboard, display screen, mouse, touch pad, or some other user input/output apparatus. User interface 902 may be omitted in some examples.

Processing circuitry 905 comprises microprocessor and other circuitry that retrieves and executes operating software 907 from memory device 906. Memory device 906 comprises a storage medium, such as a disk drive, flash drive, data storage circuitry, or some other memory apparatus. In no examples would memory device 906 be considered a propagated signal. Operating software 907 comprises computer programs, firmware, or some other form of machine-readable processing instructions. Operating software 907 includes suspension determination module 908 and visual indicator module 909. Operating software 907 may further include an operating system, utilities, drivers, network interfaces, applications, or some other type of software. When executed by processing circuitry 905, operating software 907 directs processing system 903 to operate computing architecture 900 as described herein.

In particular, operating software 907 directs processing system 903 to exchanging audio user communications for a communication between a first endpoint system and a second endpoint system. Suspension determination module 908 directs processing system 903 to determine that the second endpoint system caused a suspension of the audio user communications. Visual indicator module 909 directs processing system 903 to provide a first visual indicator of the suspension.

The descriptions and figures included herein depict specific implementations of the claimed invention(s). For the purpose of teaching inventive principles, some conventional aspects have been simplified or omitted. In addition, some variations from these implementations may be appreciated that fall within the scope of the invention. It may also be appreciated that the features described above can be combined in various ways to form multiple implementations. As a result, the invention is not limited to the specific implementations described above, but only by the claims and their equivalents.

What is claimed is:

1. A method for improving a first endpoint system connected on a communication, the method comprising:
exchanging audio user communications for the communication between the first endpoint system operated by a first user and a second endpoint system operated by a second user, wherein the audio user communications include voice communications between the first user and the second user;
in the first endpoint system, determining, via the communication, that the second endpoint system caused a suspension of the audio user communications, which includes processing circuitry of the first endpoint system processing the audio user communications to identify hold music indicating the suspension;
in the first endpoint system, providing a first visual indicator of the suspension in response to determining that the second endpoint system caused the suspension; and
in the first endpoint system, in response to determining that the second endpoint system resumed the audio user communications, removing the first visual indicator to indicate that the audio communications resumed.

2. The method of claim 1, wherein determining that the second endpoint system caused the suspension comprises:
receiving a message indicating the suspension from the second endpoint system.

3. The method of claim 2, wherein the message comprises a control message defined by one of a Session Initiation Protocol (SIP), HyperText Transfer Protocol (HTTP), or H.323.

4. The method of claim 1, wherein determining that the second endpoint system resumed the audio user communications comprises:
the processing circuitry processing the audio user communications to identify ending of the hold music.

5. The method of claim 1, wherein the suspension comprises one of the first endpoint system being placed on hold by the second endpoint system at the direction of the second user or the communication being in process of transfer to another endpoint system at the direction of the second user.

6. The method of claim 1, wherein the first visual indicator comprises an illuminated light on the first endpoint system.

7. The method of claim 1, wherein the first visual indicator comprises a graphical element presented on a display of the first endpoint system.

8. An apparatus implementing a first endpoint system connected on a communication, the first endpoint system comprising:
one or more computer readable storage media;
a processing system operatively coupled with the one or more computer readable storage media; and
program instructions stored on the one or more computer readable storage media that, when read and executed by the processing system, direct the processing system to:
exchange audio user communications for the communication between the first endpoint system operated by a first user and a second endpoint system operated by a second user, wherein the audio user communications include voice communications between the first user and the second user;
determine that the second endpoint system, via the communication, caused a suspension of the audio user communications, which includes processing circuitry of the processing system processing the audio user communications to identify hold music indicating the suspension; and
provide a first visual indicator of the suspension in response to determining that the second endpoint system caused the suspension; and
in the first endpoint system, in response to determining that the second endpoint system resumed the audio user communications, remove the first visual indicator to indicate that the audio communications resumed.

9. The apparatus of claim 8, wherein to determine that the second endpoint system caused the suspension, the program instructions direct the processing system to:
receive a message indicating the suspension from the second endpoint system.

10. The apparatus of claim 8, wherein to determine that the second endpoint system resumed the audio user communications, the program instructions direct the processing system to:
process the audio user communications using the processing circuitry to identify ending of the hold music.

11. The apparatus of claim 8, wherein the suspension comprises one of the first endpoint system being placed on hold by the second endpoint system at the direction of the second user or the communication being in process of transfer to another endpoint system at the direction of the second user.

12. The apparatus of claim 8, further comprising:
a light; and
wherein to provide the first visual indicator of the suspension, the program instructions direct the processing system to illuminate the light.

13. The apparatus of claim 8, further comprising:
a display; and
wherein to provide the first visual indicator of the suspension, the program instructions direct the processing system to present a graphical element on the display.

14. One or more non-transitory computer readable storage media having program instructions stored thereon for improving a first endpoint system connected on a communication, the program instructions, when executed by a processing system of the first endpoint system, direct the first endpoint system to:
exchange audio user communications for the communication between the first endpoint system operated by a first user and a second endpoint system operated by a second user, wherein the audio user communications include voice communications between the first user and the second user;

determine, via the communication, that the second endpoint system caused a suspension of the audio user communications, which includes processing circuitry of the processing system processing the audio user communications to identify hold music indicating the suspension; and provide a first visual indicator of the suspension in response to determining that the second endpoint system caused the suspension; and in the first endpoint system, in response to determining that the second endpoint system resumed the audio user communications, remove the first visual indicator to indicate that the audio communications resumed.

\* \* \* \* \*